(12) United States Patent
Woodbridge

(10) Patent No.: US 6,791,206 B1
(45) Date of Patent: Sep. 14, 2004

(54) METHOD FOR MAKING A STABILIZED ENERGY CONVERSION OPERATING PLATFORM

(76) Inventor: David D. Woodbridge, 10805 N. 53rd St., Tampa, FL (US) 33617

(*) Notice: Subject to any disclaimer, the term of this patent is extended or adjusted under 35 U.S.C. 154(b) by 0 days.

(21) Appl. No.: 10/461,260

(22) Filed: Jun. 12, 2003

Related U.S. Application Data

(60) Provisional application No. 60/388,502, filed on Jun. 14, 2002.

(51) Int. Cl.[7] ............................. F03B 13/10; F03B 13/00
(52) U.S. Cl. .......................... 290/53; 290/54; 290/42; 290/43
(58) Field of Search ............................. 290/53, 54, 42, 290/43

(56) References Cited

U.S. PATENT DOCUMENTS

| | | | | |
|---|---|---|---|---|
| 933,905 | A | * 9/1909 | Igatz | ............................ 60/398 |
| 3,783,302 | A | 1/1974 | Woodbridge | |
| 4,110,630 | A | * 8/1978 | Hendel | ......................... 290/53 |
| 4,159,427 | A | * 6/1979 | Wiedemann | ................... 290/55 |
| 4,260,901 | A | 4/1981 | Woodbridge | |
| 4,622,473 | A | * 11/1986 | Curry | ........................... 290/53 |
| 5,696,413 | A | 12/1997 | Woodbridge | |
| 6,020,653 | A | 2/2000 | Woodbridge | |
| 6,310,406 | B1 | * 10/2001 | Van Berkel | .................. 290/43 |
| 6,734,576 | B2 | * 5/2004 | Pacheco | ...................... 290/55 |
| 2003/0218337 | A1 | * 11/2003 | Lin | .............................. 290/42 |

FOREIGN PATENT DOCUMENTS

| | | | | |
|---|---|---|---|---|
| FR | 2561717 | * | 3/1984 | .......... F03B/13/12 |
| JP | 06010822 | * | 1/1994 | .......... F03B/13/20 |

* cited by examiner

*Primary Examiner*—Nicholas Ponomarenko
*Assistant Examiner*—Heba Elkassabgi
(74) *Attorney, Agent, or Firm*—William M. Hobby, III

(57) ABSTRACT

A floating ocean swell electric generator system includes a floating platform having a deck and an engine for propelling a floating platform. A plurality of ocean electric generators are mounted on the floating platform. Each floating generator has an elongated stator tube extending from the floating platform below the deck into the surface of the water and a floating linear rotor in the stator tube for movement with ocean swells passing beneath the floating platform. Electric energy is generated by the movement of the linear rotor in the stator tube responsive to ocean swells.

9 Claims, 9 Drawing Sheets

METHOD FOR MAKING A STABILIZED ENERGY CONVERSION OPERATING PLATFORM

This appl. claims benefit of U.S. Provisional Appl. No. 60/388,502, filed Jun. 14, 2002.

This system is directed to an energy conversion stabilized floating platform that has the capability to operate in the ocean, bays, inlets, or lakes for converting wave energy into electrical energy.

BACKGROUND OF THE INVENTION

The oceans of the world are the greatest energy storage systems on the surface of the earth. Unfortunately, a large part of this energy is completely unused. This energy is exhibited as tidal energy, swell and wave energy, as well as thermal energy. Swell and wave energy of the oceans have been a nemesis to humanity since the starting of time. Swell and waves have destroyed construction projects at all locations of the oceans. These destructive effects have been most notable where humans have tried to build structures to stop the natural motion of the oceans.

A great number of systems have been tried in an attempt to extract the inherent energy of the ocean swells or waves. Most of these systems have tried to convert the vertical motion of the ocean swells or waves into a circular motion of a normal electrical generator. Use of a reciprocating generator that moves upward and downward with the ocean swell or wave will obviously increase the operational efficiency of the system. The problem that exists for such a system is creating a method for holding the reciprocating electric generators comparatively stationary while the floating aspect of the conversion system reciprocates upward and downward with the ocean swell or wave. This arrangement, of course, could be obtained by means of a massive ocean structure, such as an ocean oil drilling platform or other structures, permanently attached to the bottom of the oceans. However, such structures are often not in locations that promote the most useful transmission of the electrical energy. To build such a platform would be very expensive.

In Applicant's prior U.S. Pat. No. 6,020,653 a submerged reciprocating electric generator is provided which is placed below the ocean surface and creates electric power from the surface ocean swells. The generator coil reciprocates linerally in response to an external force acting on a float by the passing ocean swells. A cable connects the float on the ocean surface with the reciprocating coil of the submerged generator. In Applicant's prior U.S. Pat. No. 5,696,413 an electric generator produces electric power responsive to movement of a float riding in ocean swells. A float is positioned on an oscillating fluid, such as ocean swells, and utilizes a linear moving coil directly moved by a float riding on waves or swells. The moving coil converts the kinetic energy in the wave directly to electrical energy. In the Woodbridge prior U.S. Pat. No. 3,783,302, an apparatus and method for converting wave energy into electric energy uses floats to move a flexible coil in a magnetic field. In the Woodbridge U.S. Pat. No. 4,260,901, a wave operated electrical generator system uses a float to oscillate permanent or electrical magnets into an out of electric coils.

SUMMARY OF THE INVENTION

A floating ocean swell electric generator system includes a floating platform having a deck and an engine for propelling a floating platform. A plurality of ocean electric generators are mounted on the floating platform. Each floating generator has an elongated stator tube extending from the floating platform below the deck and into the water's surface and a floating mechanism acting as a linear rotor in the stator tube for movement with ocean swells passing beneath the floating platform. Electric energy is generated by the movement of an electric coil attached to the floating mechanism and acting as a linear rotor in the stator tube responsive to ocean swells. The floating platform has a plurality of pontoons mounted thereto on a plurality of extension legs for supporting the floating, platform in the ocean. The pontoons are hollow and are fillable with air or ocean water to raise or lower the floating platform to adjust the level of ocean swell generators and emptied to raise the floating platform for movement of the platform between ocean locations. The floating platform may have a plurality of side extension arms extending therefrom with each having an ocean electric generator attached thereto having a stator tube extending therefrom along the side of the floating platform to thereby expand the number of ocean electric generators mounted to the floating platform. The floating platform deck is supported above the ocean surface by pontoons mounted on legs to allow ocean swells to move beneath the floating platform deck and over a portion of the stator tubes. A method of making of floating ocean swell electric generator system is also provided including the steps of selecting a floating platform having a deck and engine for propelling the floating platform. The floating platform can be an existing ocean vessel, such as a ship, barge or the like. A plurality of ocean electric generators is mounted to the selected floating platform with each generator having an elongated stator tube mounted to the floating platform to extend from the floating platform below the deck. Each stator tube has a floating linear rotor therein for movement with the ocean swells passing beneath the floating platform. The process may include the mounting of a plurality of pontoons to the floating platform on a plurality of extension legs for supporting the platform in the ocean with the platforms being fillable with ocean water to varying degrees to raise or lower the flooding platform to adjust the level of the ocean swell generators. The process includes mounting a plurality of side extension arms to the floating platform and mounting an ocean swell electric generator to each side extension arm having a stator tube extending therefrom along the side of the floating platform to thereby expand the number of ocean swell electric generators mounted to the floating platform.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1A:
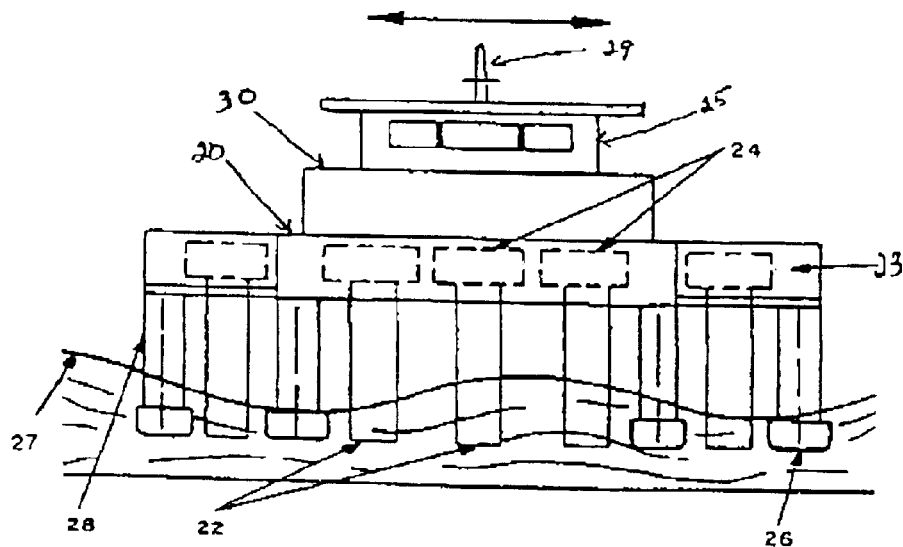
FIG. 1A is a diagrammatic view of a stabilized energy conversion operation platform or SECOP in accordance with the present invention.
Figure 1B:
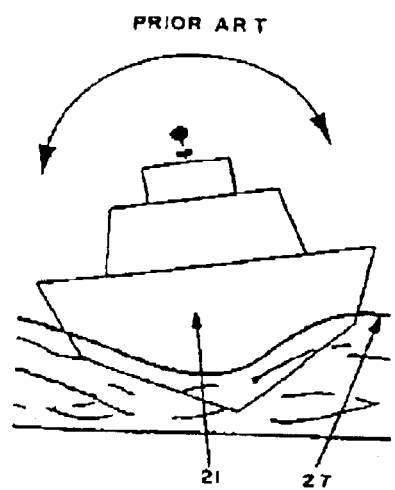
FIG. 1B is a front diagrammatic view of a conventional ship riding in ocean swells.
Figure 1C:
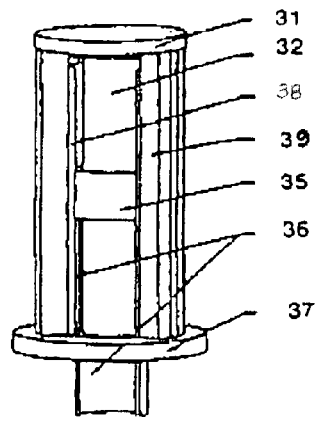
FIG. 1C is an isometric cutaway of one ocean swell electric generator.

This system is directed to an energy conversion formation of a stabilized floating platform, conversion of a cargo ship, and/or a barge conversion system that has the capability to operate in the ocean, bays, inlets, or lakes for converting swell and wave energy into electrical energy and also as a recreational system. The pontoons of the stabilized floating platform system are capable of being filled with air to float the platform or filled with water to sink the platform such that the pontoons can be on the surface or under water. In the submerged position, the pontoons would serve as a stabilization system. Auxiliary gyro stabilizers could be incorporated in any of these systems to increase the stability.

Referring to FIGS. 1–6, a stabilized energy conversion operation platform (SECOP) is illustrated. This type of energy conversion system is stabilized by underwater pontoons such that the energy deck where the generators would be located would be relatively stable. Tubes having floats thereon are stationed to extend downward into the ocean. Floats in the tubes would extend below and above the ocean level and thus move upward and downward as each swell or wave passes beneath the platform. Cylindrical tubes or shafts connect a float to reciprocating coils or magnets or to a lever arm mechanism to drive either the coils or the magnets into and out of the other components of the electric generator creating an electromotive force or the electrons in the coil. Thus, the natural motion of the ocean swell or wave would not be stopped nor hindered. Only some of the energy would be extracted from the vertical motion.

Actual motion of an electric coil or the magnetic poles in the direct operating system can be seen in my prior U.S. Pat. No. 5,696,413 and U.S. Pat. No. 4,260,901 which show how either the magnetic poles or the electric coils can be operated. In addition, the end bell of the straight reciprocating system can consist of a series of strips such that they could be wound so that part of the generated electric current could be channeled to increase the magnetic field strength of the generator. Such stator windings could also be used in the magnetic poles.

A second and/or third deck above the energy deck could be used for quarters for the operating personnel and platform crew. In addition, the third deck could be used as a casino, scuba diving quarters, or fishing deck and visitors quarters. The parts of the SECOP connecting the stabilizing floats to the body of the vessel must be in sections so that the swells or waves are not impeded by a solid wall. Thus, regardless of what direction the waves impinge upon the SECOP vessel, they can pass beneath the main part of the vessel.

Actual ocean or other water motion and operation of the platform would be similar to any diesel or electric ship. Propulsion screws would be located at the stern of the submerged floats with an appropriate rudder system. Control devices would be located on a bridge deck on the upper forward part of the platform. Actual engines for driving the propulsion system would be either in the pontoons themselves or in the structure connecting the pontoons to the upper structure of the platform. Propulsion systems could be located in all of the pontoons or only in the two central pontoons. For smaller platforms that have only two pontoons, the propulsion system would be related to the two pontoons. Normal ship control mechanisms and operational systems would be used to control the operation of the platform when moving or holding a position. A special anchoring system would keep the SECOP headed into the swells and waves.

A basic SECOP system would hold from five to fifteen generator systems. The size of the SECOP system could range over the length of standard boats, catamarans, trimarans, ships or other floating vessels. A number of these units could be connected so as to produce a large ocean swell and wave energy complex with solar and wind energy complimentary systems. Such a SECOP system would produce energy ranging from a few kilowatts to hundreds of megawatts of power. The SECOP system could produce energy for an industry, transportation systems, towns, or cities or any electrical energy recharging system. A SECOP system can be used to create energy for the production of hydrogen directly from the ocean water or an auxiliary water source.

The present invention is shown in FIGS. 1 through 6. FIG. 1A shows tie basic connect of the SECOP system 20 compared to the action of a ship 21 in a rolling sea in FIG. 1B. The SECOP 20 of FIG. 1A has a plurality of tubes 22 connected to a plurality of OSWEC's 24 mounted on an energy deck 25. The vessel has an antenna 29 and has a plarality of pontoon floats 26 supported on arms 28 extending therefrom to support the platform 25 above the ocean surfaces 27. FIG. 1c shown the ocean swell and wave energy conversion system 24 having a base 37 at one end and an end bell 31 at the other end with a plurality of outer poles 39 therebetween and a plurality of permanent magnets forming a stator 38. A linear rotor or generator coil 35 is supported on a coil supporting tube 36 which moves on a center pole 32. As the linear rotor 35 coil move within the stator 38 permanent magnetic field, electric power is generated.

Figure 2:
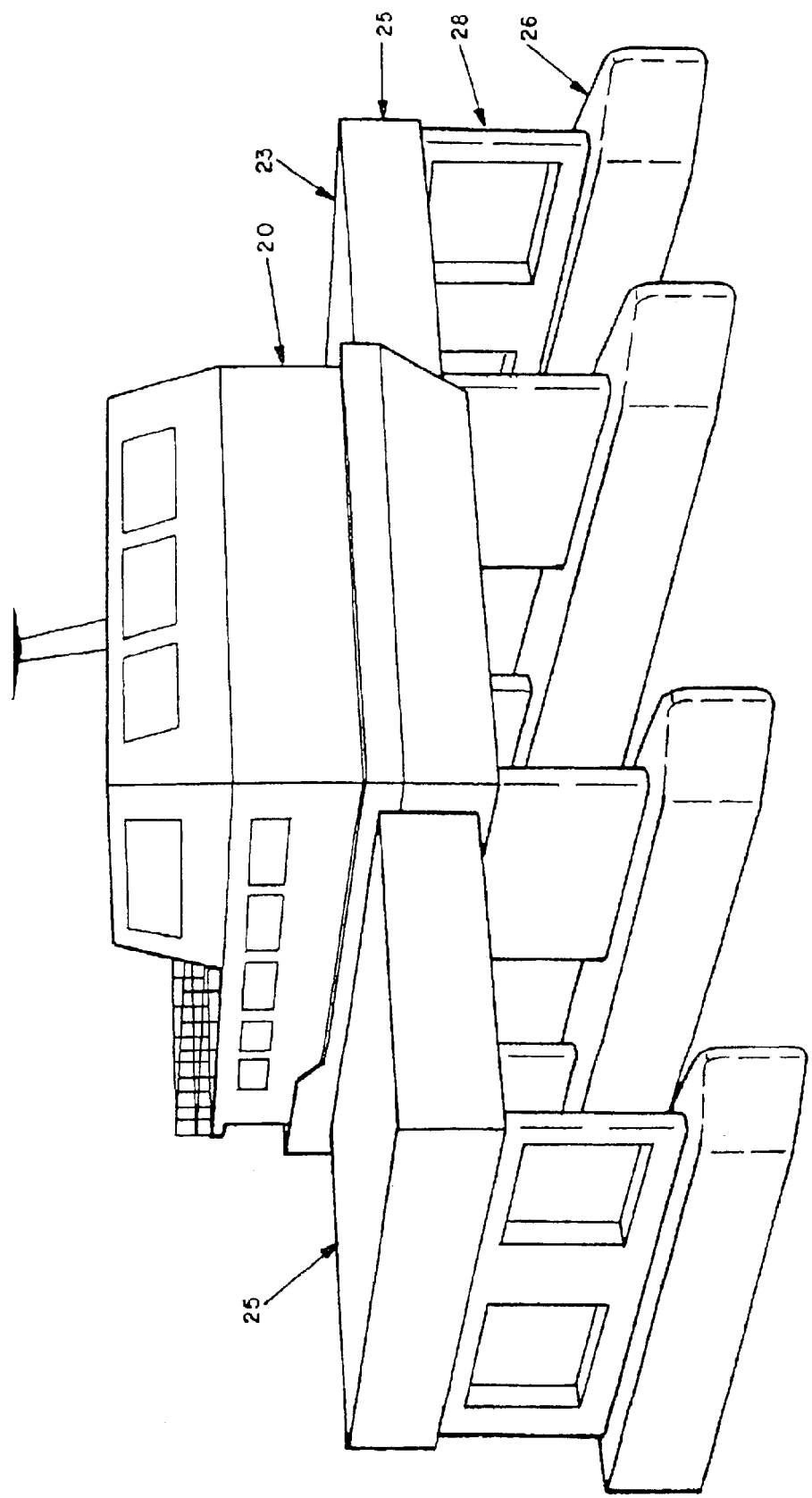
FIG. 2 is a perspective view of a SECOP.
Figure 3:
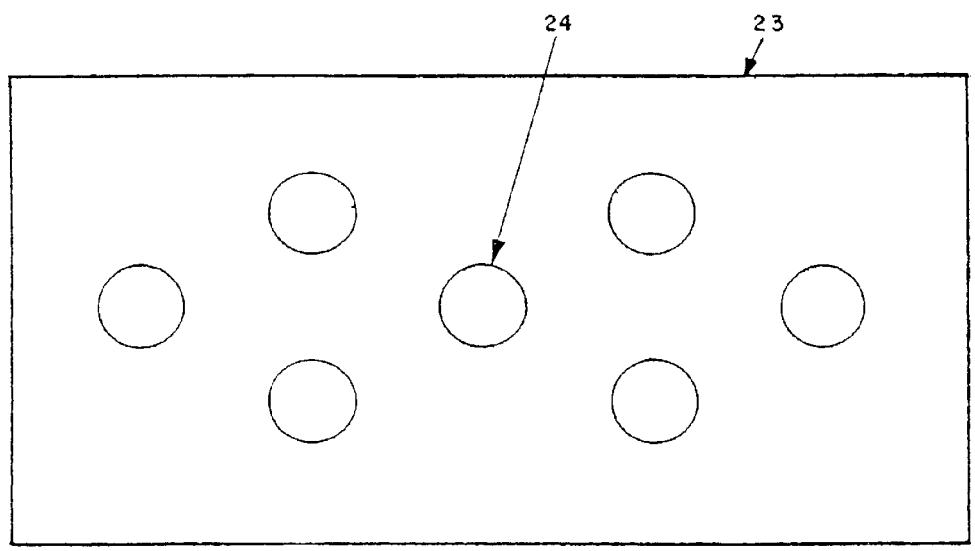
FIG. 3 is a sectional view of the energy deck of the SECOP of FIG. 2.
Figure 4:
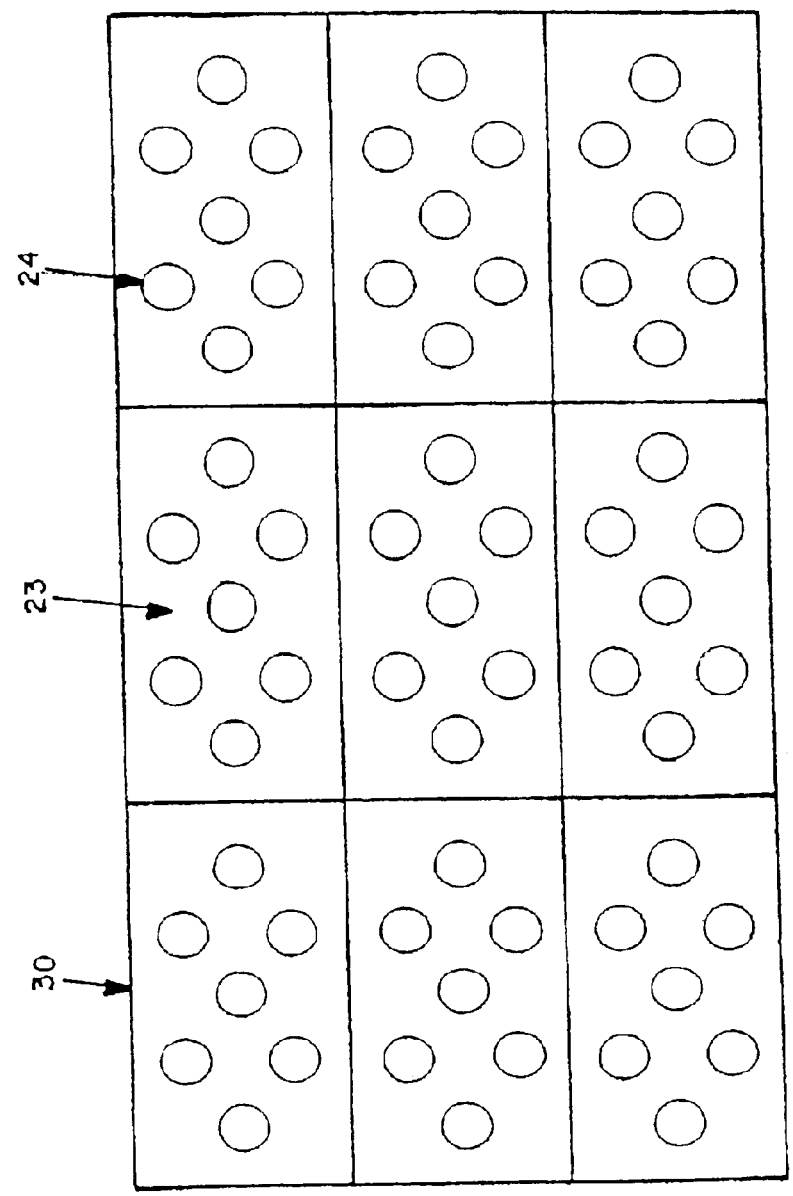
FIG. 4 is a diagrammatic view of a cluster of ocean swell and wave conversion (or OSWEC) systems.
Figure 5:
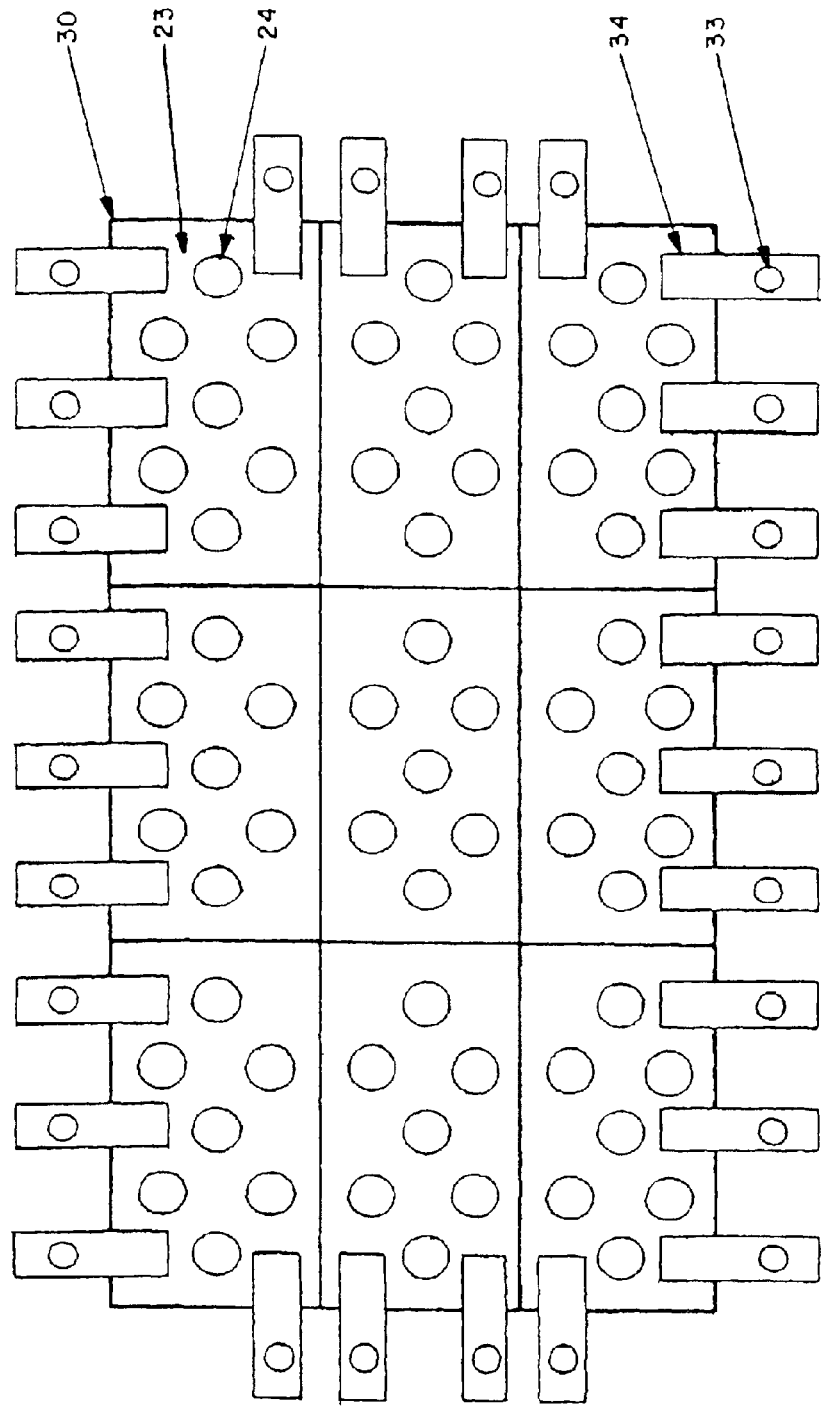
FIG. 5 is another schematic of a cluster of OSWEC's.

FIG. 2 shows the SECOP system without any of the ocean energy tubes. FIGS. 1 and 2 show the SECOP system as a quartermaran design. However, the system could be a catamaran, trimaran, or a single ship, or a series of ships connected together. FIGS. 3 and 4 show top views of the energy conversion deck 23 of a small SECOP system that could be used for exploration or testing, with positions for seven ocean swell and wave conversion (OSWEC) systems. SECOP systems can be constructed using much larger or even smaller dimensions than those shown in FIG. 3 and be designed to include other numbers of OSWEC energy convertors. FIG. 4 shows a top view of the energy conversion deck 23 of an expansion of the small basic system into a set of nine connected SECOP systems 30, each having seven OSWEC's 24. One method of expanding the number of OSWEC systems of a SECOP system is shown in FIG. 5 having added OSWEC's 33 mounted on side extension platforms 34. Another method of increasing the number of OSWEC systems for any number of energy conversion systems would be to separate the boat systems and connect them with an appropriate load carrying deck and supporting structure.

The pontoons 26 are designed so that they can be filled with air such that they will raise the SECOP 20 and float 26 on the surface when moving the SECOP from one location to another location. When operating as an energy conversion system, the pontoons are filled with water to sink the SECOP to the desired level to have the OSWEC floats operate correctly and to stabilize the platform.

Figure 6:
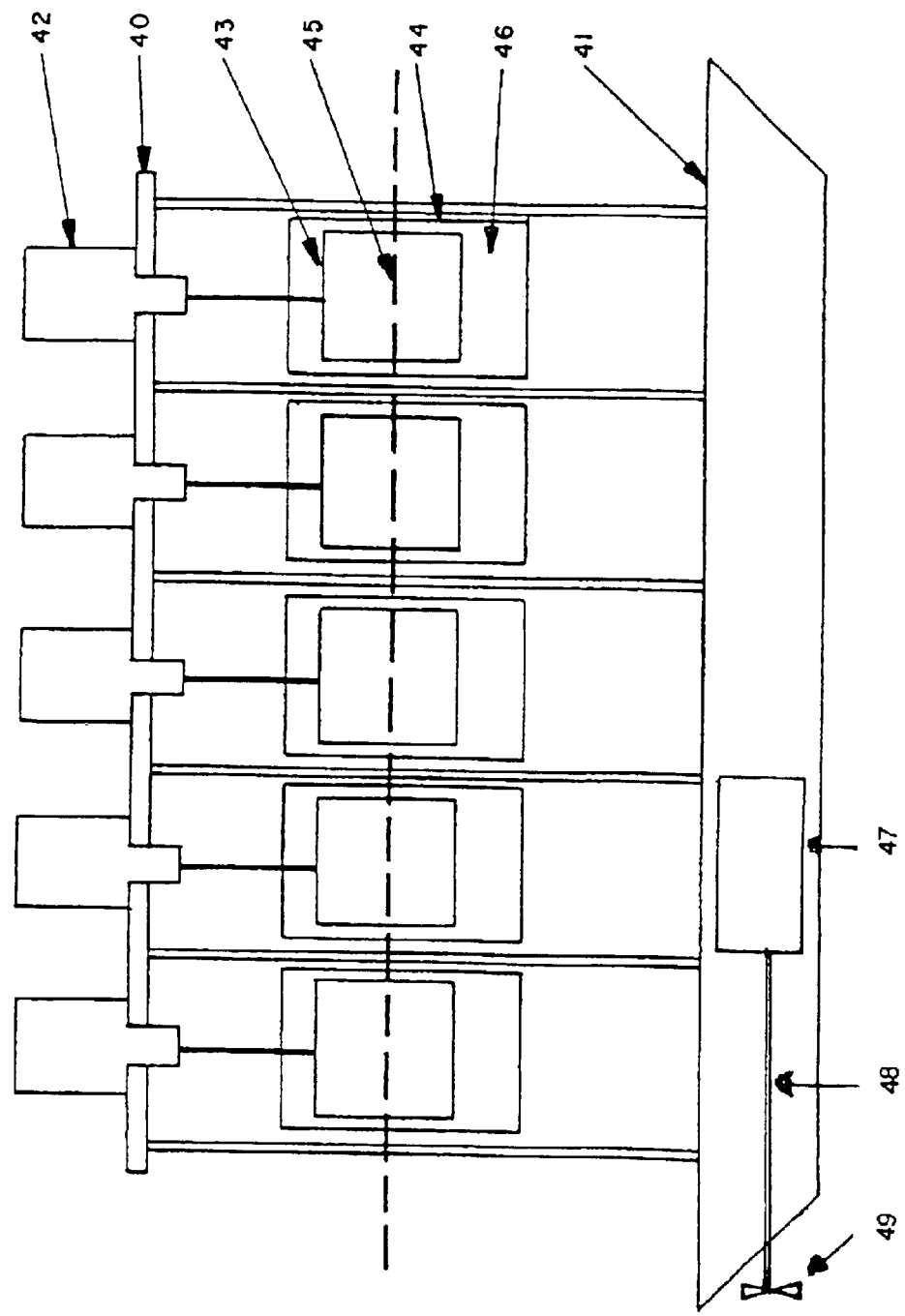
FIG. 6 is a side sectional view of an ocean swell and wave electric conversion system.

FIG. 6 shows a side view arrangement of OSWEC systems on a single ship to form an ocean energy conversion vessel 40 having pontoons 41 and OSWEC generators 42. The drive action floats 43 rise and fall within the tubes 44 as the water level 45 varies. FIG. 6 also shows the engine 47 drive shaft 48 and propeller 49 within the pontoon 41.

Figure 7:
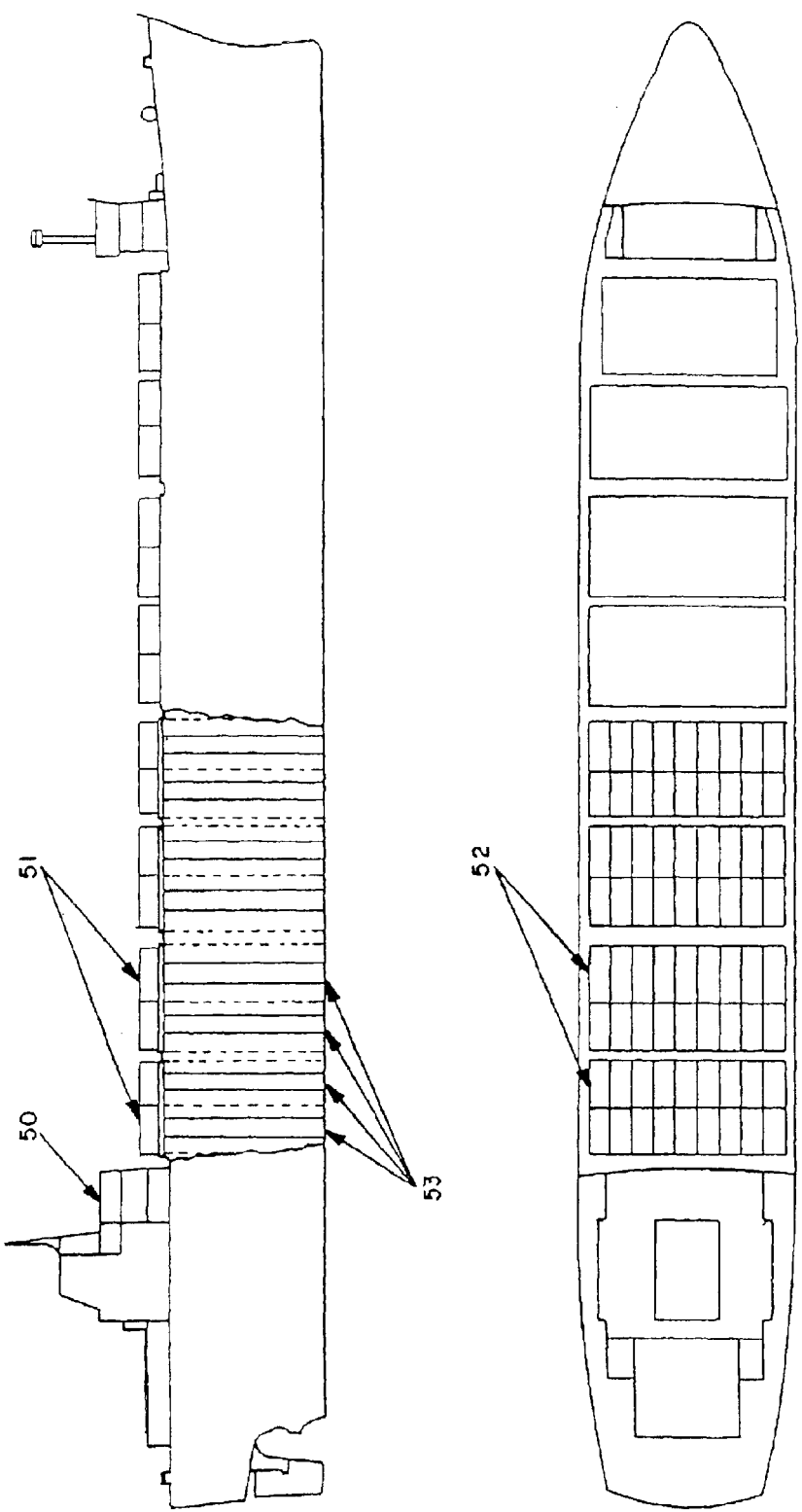
FIG. 7 is two views of an energy conversion ship.

A ship can be converted into a wave energy conversion vessel, as shown in FIG. 7. Maximum electric energy can be developed if the ship is stabilized by conventional gyroscopic stabilizers. Arrangements of the energy conversion systems will vary depending upon the type of system used and the manner in which it is used. Such ocean energy conversion ships have the capability of supplying energy from the ocean off of any coast line where ocean swells and waves exist. A complete ship 50 could be converted or new ships built as shown in FIG. 7 to provide an easily movable ocean energy platform. The ship 50 has an electric generator deck 51 having energy generator modules 52 and extension holes 53 for supporting floats therein. A large variety of ship designs could be converted or built to be SECOP systems or ocean energy conversion ships or ocean barges.

Figure 8:
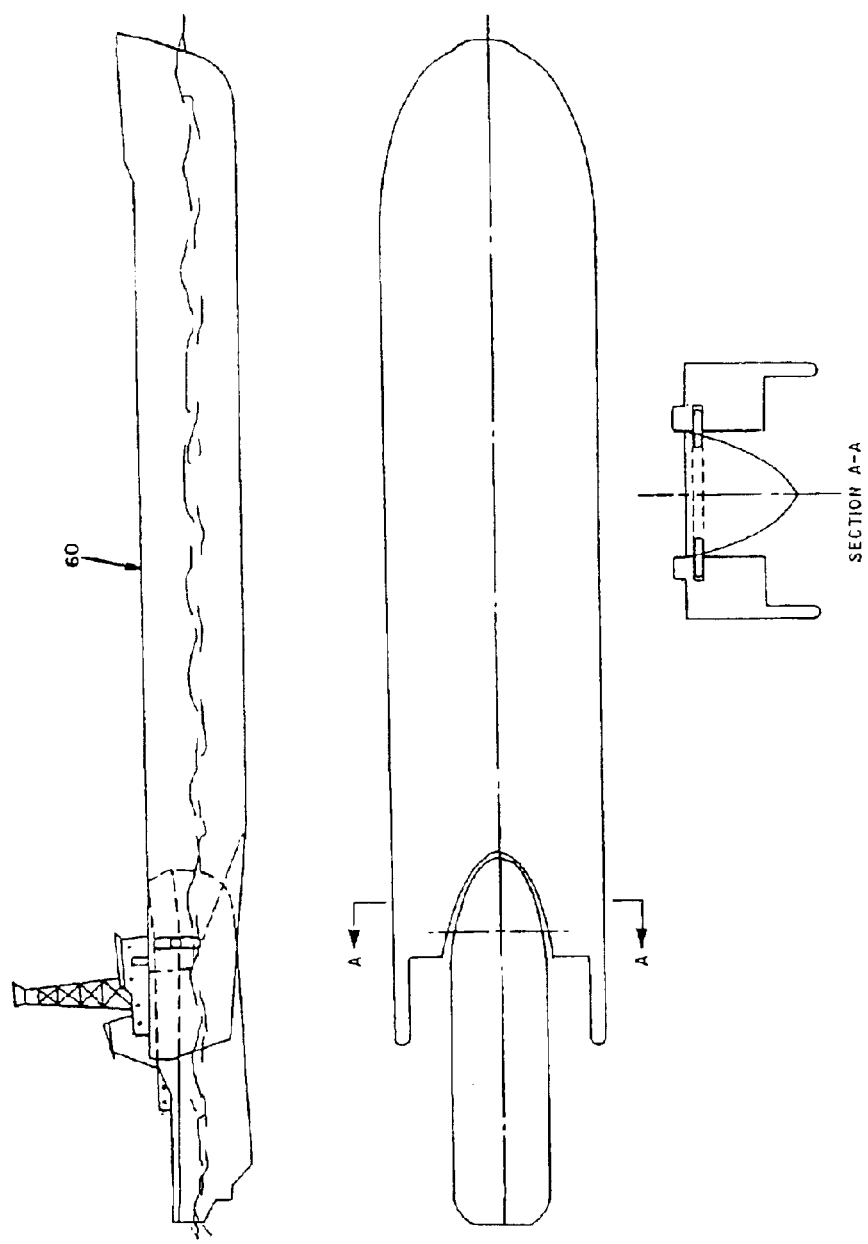
FIG. 8 illustrates a tug energy barge system.
Figure 9:
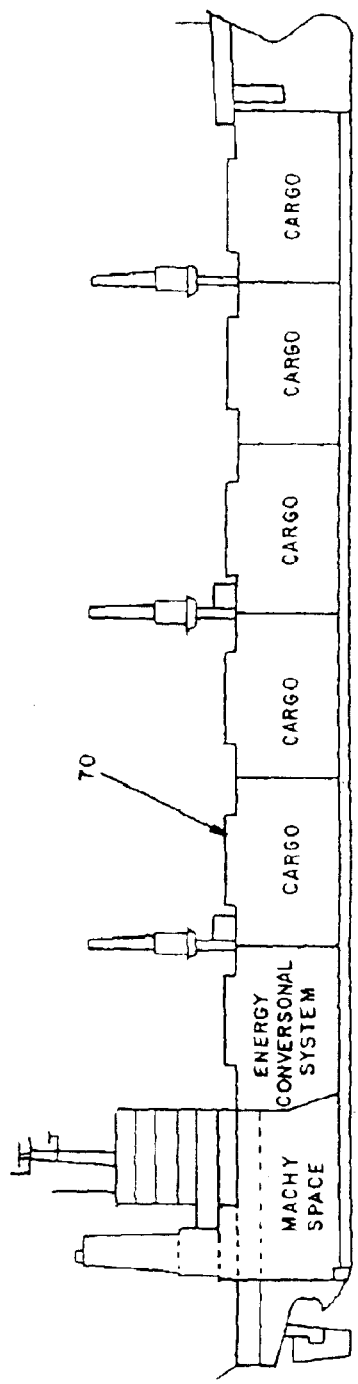
FIG. 9 is a side sectional view of a cargo ship with one or more holds converted to wave energy conversion systems.

An ocean energy platform also could be constructed using one or more commercial ocean barges. Several barges could be connected to stabilize the platform or out-riggers could be deployed to stabilize the platform. FIG. 8 shows a combined tugboat/barge system 60 that can be converted or built into a SECOP system. A normal ocean barge also could be converted or built as an ocean energy platform. Such a barge would be pulled by tug boats to the location of operation. FIG. 9 is an ore or oil ship 70 having a plurality of cargo areas for conversion to a SECOP.

In addition, a limited number of OSWEC systems could be built into or onto regular ships to provide ship operation power. FIG. 9 shows one example of the conversion of a cargo ship so that it has the capability to use energy from the ocean. Thus, a ship could be entirely or partially operated by the ocean swells and waves. Auxiliary diesel power would be required for operation when a flat sea existed or in harbors. These ocean barges or ships also could have erectable and removable wind or solar energy systems. In this manner, a ship can be constructed such that it could be completely or partially energized by the environment in which it operates.

The system has the following features and advantages: a floating system that includes pontoons, an energy conversion deck, crews quarters, and a control deck to serve as a floating ocean swell and wave energy conversion platform and may include solar and wind energy conversion systems. Pontoons that can extend downward from the energy control deck or main part of the platform into the water and have a flared or wing upper surface to decrease vertical motion when the pontoons are submerged. Pontoons that can hold the drive mechanisms for the platform and be able to be filled with air to raise the platform so that the pontoons are partially out of the water or filled with water to sink the pontoons below the swell or wave trough to stabilize the platform. The actual height of the energy conversion deck above the water level can be controlled by the buoyancy of the pontoons. Propulsion screws can be located at the stern end of two or more of the pontoons to provide motion and control of the platform. A rudder system can also be connected to the stern end of the pontoons for control of the platform's motion. The propulsion screws are operated either by an electric or diesel motor and controlled by normal ship operating mechanisms. The pontoons can be extended sideways under water from the central structure so as to resist rising and descent with each wave in the water. The connections of the pontoons to the vessel itself are separated so swells and waves can pass between them and under the vessel. A system for the use of a series of tubes to extend downward from the energy conversion deck and enclose floats that would be suspended at the surface of the water such that the float moves upward as each swell or wave crest passes and downward as each trough passes. Floats can be connected to tubular or rod structures extending from the float into the energy conversion deck area above the floats. The ocean floating platform with electric generating mechanism converts the ocean swells and wave energy while solar and/or wind energy is also being used to generate electrical energy. The upper decks of the platform can be constructed to be used as casinos, fishing systems, and with appropriate structure for scuba diving or any combination of recreational facilities. An existing ocean barge or ship can be converted into a floating energy conversion system by means of extending tubes downward through the bottom of the barge or ship so that the tubes are open at the bottom into the water. A float in the tube will reciprocate in a vertical motion as each wave crest or trough passes by the ocean barge or ship. One or several different forms of wave energy converters can be located at the top end of the tube and operated by the reciprocating action of the float in the tube. Batteries within the SECOP ocean energy conversion barge or ships can store excess energy under high wave or wind conditions. This energy storage unit can be used for ship operation under conditions of flat seas on calm days.

I claim:

1. A floating ocean swell electric generator system comprising:

a floating platform having a deck and an engine for propelling said floating platform and a plurality of pontoons mounted thereto floating said platform in the ocean above the general level of ocean swells;

a plurality of ocean swell electric generators mounted on said floating platform, each electric generator having an elongated stator tube extending from said deck into the ocean surface and having a floating linear rotor therein for movement with ocean swells passing beneath said floating platform; whereby electric energy is generated by the movement of said linear rotor in said stator tube responsive to ocean swells.

2. The floating ocean swell electric generator system in accordance with claim 1 in which said floating platform plurality of pontoons mounted on a plurality of extension legs for floating said floating platform in the ocean above the general level of ocean swells.

3. The floating ocean swell electric generator system in accordance with claim 2 in which said floating platform plurality of pontoons are hollow pontoons fillable with ocean water to raise or lower said floating platform to adjust the level of said ocean swell electric generators and emptied to raise said floating platform relative to the general level of ocean swells.

4. The floating ocean swell electric generator system in accordance with claim 3 in which said floating platform has a plurality of side extensions arms extending therefrom, each having an ocean swell electric generator attached thereto having its stator tube extending therefrom along the side of said floating platform to thereby expand the number of ocean swell electric generators mounted to said floating platform.

5. The floating ocean swell electric generator system in accordance with claim 1 in which said floating platform deck is supported above the ocean surface by said leg mounted pontoons to allow ocean swells to move beneath said floating platform deck and over a portion of said stator tubes.

6. A method of making a floating ocean swell electric generator system comprising the steps of:
- selecting a platform having a deck and an engine for propelling said platform in the ocean;
- mounting a plurality of floating pontoons to said platform for floating said platform above the general level of ocean swells when said platform is floating in the ocean;
- mounting a plurality of ocean swell electric generators to said floating platform, each ocean swell electric generator having an elongated stator tube mounted to said platform and extending from said platform below said deck and into the water surface and each said stator tube having a floating linear rotor therein for movement with said ocean swells passing beneath said platform; whereby a floating ocean swell electric generator system is made which can generate electric energy by the movement of a plurality of linear rotors, each moving in a stator tube responsive to ocean swells.

7. The method of making a floating ocean swell electric generator system in accordance with claim 6 including the step of mounting said plurality of pontoons to said platform on a plurality of extension legs for supporting said platform in the ocean above the general level of ocean swells.

8. The method of making a floating ocean swell electric generator system in accordance with claim 7 which the step of mounting said plurality of pontoons to said platform includes mounting a plurality of said hollow pontoons, each being fillable with ocean water or air to raise or lower said platform to adjust to the level of ocean swells.

9. The method of making a floating ocean swell electric generator system in accordance with claim 8 including the step of mounting a plurality of side extensions arms to said platform, and mounting an ocean swell electric generator to each side extension arm having its stator tube extending therefrom along the side of said floating platform to thereby expand the number of ocean swell electric generators mounted to said floating platform.

* * * * *